united States Patent Office 3,247,290
Patented Apr. 19, 1966

3,247,290
EXTRUSION COATING RESIN COMPRISING A BLEND OF LOW DENSITY POLYETHYLENE AND THERMALLY DEGRADED HIGH DENSITY POLYETHYLENE
Robert T. Werkman and Clyde V. Detter, Bartlesville, Okla., assignors to Phillips Petroleum Company, a corporation of Delaware
No Drawing. Filed July 13, 1961, Ser. No. 123,645
9 Claims. (Cl. 260—897)

This invention relates to extrusion coating resins. In one aspect the invention relates to a blend of polymers of ethylene suitable for use as extrusion coatings. In another aspect this invention relates to an extrusion coated article of manufacture and the method of preparing same.

Resinous compositions particularly suitable for coating paper or similar substrates are many and varied and include polymers of 1-olefins such as polyethylene. The coating of paper and similar materials with polyethylene is well known and the extrusion process for application of such coatings has been highly developed. When high speeds are desired in the application of the coatings, and particularly at low coating weights, these procedures have been heretofore conventionally limited to use of a polyethylene having a density of less than 0.930 gm./cc., such as that prepared by the well known high pressure process. The production of polymers of ethylene having a high density and high crystallinity is well known in the art with one such suitable method being disclosed in U.S. Patent No. 2,825,721, issued March 4, 1958, to Hogan and Banks. An examination of the physical properties of these so-called high density polyethylenes indicate that they should be a valuable addition to the paper coating art. Such properties as attractive barrier properties against moisture vapor transmission, excellent greaseproofness, improved scuff and abrasion resistance and high temperature resistance are characteristics which could be of great value in upgrading available coated products and making possible new developments capable of withstanding more severe service conditions. However, these high density polymers of ethylene are generally deficient in their processability or extrudability, i.e., the ability of the polymer to be further worked or extruded by conventional extrusion coating equipment at speeds of operation and at coating weights which are possible with the lower density polymers. It has now unexpectedly been found that certain blends comprising these high density resins can be employed at coating rates of more than 600 ft./min. A reduction in the necessary amount of the coating from 45 to 5 lbs. or less per ream can be achieved by the utilization of the blend and process of this invention.

A coating material applied to a substrate performs one or more functions:

(1) It acts as a barrier against moisture vapor transmission,
(2) It acts as a grease-proofing agent,
(3) It provides a means of heat sealing,
(4) It serves as a laminating medium, and/or
(5) It improves the strength, abrasion resistance, or gloss of the substrate.

Coating materials have been applied to a wide variety of substrates by the general technique of extruding hot resin through a flat film die and drawing the molten web down through the nip of two rolls together with a suitable substrate and by such means laminating it therewith. While a number of different thermoplastic resins have been used, polyethylene has been among the foremost materials for such coatings. Paper and paper board account for the largest volume of all polyethylene coated products with the remainder distributed among such specialty substrates as Cellophane, metal foils, polyester film, scrim cloth, burlap, and the like. Cellophane-polyethylene combinations are primarily used in the food packaging field with the polyethylene coating improving the cellophane durability.

Aluminum foil is also coated with polyethylene primarily to permit heat sealing, fill pin holes, and improve puncture resistance and low temperature flexibility. Heat sealability is a prime reason for coating polyester film with polyethylene resin with these combinations being used in packaging for "heat-in-the-bag" pouches. The polyethylene-polyester film combination offers excellent strength, dimensional stability and high temperature resistance.

Polyethylene coated multiwall bags today are widely used by the chemical industry to package a variety of products such as ammonium nitrate, calcium fluoride, and the like. As a coating on kraft paper, polyethylene complements the reinforcement and ready printability of the substrate by adding moisture impermeability, heat sealability and good contents-release characteristics.

It is an object of this invention to provide a novel resinous composition particularly suitable for coating paper or similar substrates.

It is another object of this invention to provide a novel method for preparing a resinous composition particularly suitable for coating paper or similar substrates.

Yet another object of the invention is to provide a novel blend of polymers of ethylene having characteristics particularly suitable for coating paper or similar substrates.

Yet another object of the invention is to provide a method of improving the extrusion coating properties of high density polyethylene.

Still another object of the invention is the novel blend of a visbroken high density polymer of ethylene and a low density polymer of ethylene.

These and other objects of the invention will become more readily apparent from the following detailed description and discussion.

These objects are broadly accomplished by the method of this invention by preparing a novel composition comprising a blend of (a) a visbroken high density polyethylene and (b) a low density polyethylene, said blend having a melt index in the range of 5 to 20, preferably 5 to 15, a density in the range of 0.950 to 0.965 gms./cc., preferably 0.955 to 0.962, and a CIL flow curve slope in the range of 1.5–1.9, preferably 1.6 to 1.9, as these terms are hereinafter defined.

In one aspect of the invention the high density polyethylene is visbroken at an elevated temperature prior to blending to narrow the molecular weight distribution of the polymer.

In another aspect of the invention the low density and high density polymers are preblended and then subjected to visbreaking to narrow the molecular weight distribution.

It has been found that narrow molecular weight distribution is one of the desirable features of a resin which will permit the high draw down speeds or shear necessary in the extrusion coating art. It is also known to thermally degrade or visbreak high density polymers of ethylene. It was however most surprising to discover that visbreaking the high density polyethylene and blending with a very minor amount of the low density polyethylene would provide a composition which can be employed at coating speeds of 600 ft./min. or better, and the coating weights can be reduced from 45 to as low as 5 lb./ream or less without substantial deterioration of the low gas and water vapor transmission properties which are characteristic of the high density polymers of ethylene.

This invention is broadly applicable to polymers having a density in the range of 0.940 to 0.990 gms./cc., preferably 0.950 to 0.970 and a melt index of less than 8.0, preferably from 3.0 to 8.0 prior to visbreaking.

A suitable method for the production of these high density polymers of ethylene is disclosed in Hogan et al., supra, that solid polymers and copolymers of 1-olefins, e.g. ethylene, can be produced by contacting one or more such olefins with a catalyst comprising as an essential ingredient chromium oxide preferably including a substantial amount of hexavalent chromium. The chromium oxide is associated with at least one other oxide particularly selected from the group consisting of silica, alumina, zirconia, and thoria. The term "polymer" as used herein includes both homopolymers and copolymers. Copolymers such as ethylene-propylene copolymers and ethylene-1-butene copolymers can also be prepared by utilizing the above chromium oxide-containing catalyst and are included within the scope of this invention. The olefins are frequently polymerized in the presence of a hydrocarbon diluent, for example, an acyclic, alicyclic, or aromatic compound.

Another suitable procedure for the production of these high density polymers involves polymerization of ethylene using initiator systems comprising mixtures of an organometal, a metal hydride, or an elemental metal of Group I, II, or III of the Periodic System with a salt or alcoholate of a metal of Group IV, V, VI or VIII.

As previously stated, the compositions of the present invention comprise a blend of a visbroken high density polymer of ethylene with a small amount of a low density polymer of ethylene. By visbreaking is meant the treatment of a polymer by such means that weight average molecular weight is substantially reduced with but slight change in number average molecular weight. As is well known to those skilled in the polymer art, the molecules in a given polymer vary in individual molecular weight over a fairly broad range. By a visbreaking procedure this range is substantially reduced by preferentially degrading the longest polymer chains without substantial change in the length of the shorter chains.

Visbreaking can be effected by any suitable means, e.g. by thermal treatment under suitable conditions of time and temperature, by mechanical working, or by a combination of these methods. It is also possible to treat a slurry of the polymer in a suitable dispersing medium with air or oxygen to effect visbreaking of the polymer. By whatever means the visbreaking step is effected, the polymer is subjected to sufficient treatment to raise the melt index into the range between about 5 and about 25, preferably from about 8 to about 20 and to effect a reduction in the slope of the CIL flow curve of at least 5 percent.

A presently preferred method for visbreaking a high density polymer of ethylene for use in the blends of our invention involves passing the polymer through a heated zone in which the temperature is in the range between 600 and 900° F., preferably between 700 and 800° F., residence time in this zone being from 3 to 10 minutes. From the heated zone the polymer is conducted through a steam cooled tube wherein the temperature is lowered to below 500° F. and then into a water bath at ambient temperature. Since in the visbreaking zone the polymer is subjected to mechanical working at elevated temperature, at least a portion of the visbreaking is effected thereby.

Several methods are known to the art for determining the potential capabilities of the polymer for use in extrusion coating procedures. One suitable method is the determination of flow when subjected to high shear pressures. The subjection of the polymer to high shear and the determination of flow characteristics under such conditions is necessary in order to duplicate as near as possible the ultimate extrudability and processability of the polymer under commercial conditions. One well known method of determining flow under high shear conditions is known as CIL flow which, as herein defined, is determined by the use of a rheometer developed by Canadian Industries, Ltd. (described more fully in Journal of Applied Physics 28, 624, E. B. Bagley, May 1957) which is a capillary type machine capable of operating in the temperature range of 257–600° F. Pressures up to 2500 p.s.i. are supplied to the molten polymer by a nitrogen cylinder. Unless otherwise specified the data contained herein were taken at 500° F. and 1000 p.s.i. The capillary used to collect the data had a diameter of 0.01925 inch and a length of 0.176 inch. In operation of this device, molten polymer is extruded through the capillary and the extrusion rate in grams per minute determined.

The high pressure (low density) type polymers of ethylene used as a blending material, has a density below about 0.930 gm./cc., preferably 0.910 to 0.930.

It has been found that by running a series of tests utilizing the apparatus hereinbefore described for the determination of high shear or CIL flow and varying the pressure used at a constant temperature that the plot of the flow in grams per minute from the orifice at a constant temperature (say 500° F.) against pressure on a log plot results in a straight line the slope of which is a function of the molecular weight distribution. In other words as the slope of the CIL flow curve decreases there is a narrowing in the molecular weight distribution in the polymer. It has been found that the visbroken polymer used in the blend of this invention should have a CIL flow curve the slope of which is at least 5 percent less than that of the parent polymer, preferably 5 to 45 percent less, even more preferably 5 to 20 percent less. A further criterion for the selection of the visbreaking conditions is that the ultimate visbroken polymer used for the extrusion coating operation has a melt index in the range of between about 5 and about 20.

As discussed hereinbefore the high density polymer may be visbroken and then blended with the low density polymer or the two polymers may be blended and the blend visbroken prior to the extrusion coating operation. In the latter application the visbroken blend should have a CIL flow curve slope of at least 5 percent less, preferably 5 to 45 percent less, even more preferably 5 to 20 percent less, than that of the high density polymer component.

Blending of the low density polymer with the high density polymer can be achieved by any suitable means known to those skilled in the art, such as dry blending followed by mixing on a roll mill or a Banbury mixer or solution blending, and passing through an extruder.

The amount of low density polyethylene in the blend is in the range of between about 5 and about 24 parts per hundred weight parts of blend, preferably 5 to 20 parts per hundred weight parts.

In extrusion coating the polymer is extruded through a slot die at a temperature range between about 400 and 700° F. While in the molten state it is drawn through the nip of two rolls together with the substrate. Pressure is applied by the rolls to effect lamination with one roll being water cooled to solidify the polymer and the other made of rubber or similar material which operates to hold the substrate against the polymer. The rolls are situated as closely as possible to the die and are so disposed that the polymer contacts the substrate at the nip of the rolls or slightly on the rubber roll side in order that satisfactory adhesion is realized. The chill roll is cooled in a manner such that the temperature of the surface is below that at which the polymer becomes sticky generally below about 200° F. and is generally provided with a variable speed drive by which means the extruded polymer is drawn to the desired thickness prior to contact with the substrate. It is generally desirable to pass the completed laminate over a trimming device by which the edges are removed to eliminate a bead which usually forms during the laminating process.

The compositions of this invention retain the advantages of low moisture vapor transmission, high grease resistance, excellent adhesion and scuff resistance inherent in high density polymers of ethylene and can be applied at high rates of speed with reduced coating weights, e.g. as low as 4 lbs. per ream, using conventional extrusion coating equipment and techniques.

Another factor which is of prime importance for some applications is what is commonly known as grease proofness. Grease proofness can be a very important property not only in metal parts and military packaging applications but also in the packaging of greasy or oily foods. The blend of this invention passes the grease proofness test at a coating weight of 12 lbs. per ream or less while the medium and low density polyethylene require coating weights of 20 lbs. per ream or more to pass the same test.

As defined herein grease proofness is determined by the procedure outlined in MIL–B–121A.

Density as used herein is determined by compression molding a slab of the polymer, cooling said molding at a temperature reduction rate of 15 to 20° F. per minute to room temperature, cutting a pea-sized specimen therefrom, and placing said specimen in a 50 milliliter glass stoppered graduate. Carbon tetrachloride and methylcyclohexane are added to the graduate from burettes in proportion such that the specimen is suspended in the solution. During the addition of the liquids the graduate is shaken to secure thorough mixing. When the mixture just suspends the specimen a portion of the liquid is transferred to a small test tube and placed on the platform of a Westphal balance and the glass bob lowered therein. With the temperature shown by the thermometer in the bob in the range 73 to 70° F., the balance is adjusted until the pointer is at 0. The value shown on the scale is taken as the specific gravity.

For melt index the method of ASTM–D–1238–52T is used with 5 runs being run at 2 minute intervals, averaging the 5 weights, discarding any values which deviate from the average by more than 5 weight percent, re-averaging and multiplying by 5 to obtain the amount of extrudate in 10 minutes. If the melt index is low such as less than 1.0 the high load melt index may be obtained by ASTM–D–1238–57T (Procedure 5) using a weight of 21,600 grams.

Of all the properties of coated paper, moisture vapor transmission rate (MVTR) is possibly the most important one. This is especially true for those coaters interested in such applications as the multiwall bag for coated paper and bags now often sold on the basis of moisture vapor properties rather than coating weight. For the purposes of this discussion MVTR is determined by the method defined in ASTM–E–96–53T.

Nearly all coating resins have a point at low coating weights and high speeds where a surging effect is obtained which is generally considered the limiting factor for coating speeds.

The term "surging" as used herein refers to the erratic or uneven drawing of the molten web being extruded from the extruder head into the nip of the roll.

The blend of this invention is utilizable at extrusion coating conditions normally used for coating.

The most commonly varied conditions in paper coating are chill roll temperature, die to nip roll distance (sometimes termed air gap), and melt temperature. Chill roll temperature has the lesser effect on the coating as long as the roll temperature is low enough to prevent sticking. Melt temperature has the most pronounced effect on the obtainable minimum coating weight and adhesion. Generally, the temperature will be sufficiently high to achieve good adhesion but low enough to prevent substantial decomposition.

The adhesion of the polymer to the substrate is determined on a Perkins-Southwick Bond Tester using a 40-pound ream multiwall grade kraft paper. The laminate is aged 24 hours after coating before the tests are carried out. The testing machine operates as follows.

A single sheet of the coated material to be tested is held with its uncoated surface over an outlet from a plenum chamber into which nitrogen, at a predetermined pressure, is admitted and allowed to accumulate. A seal around the outlet exposes one square inch area of the uncoated surface of the sample to serve as a vulnerable barrier to the escape of the accumulating nitrogen. The nitrogen readily penetrates the substrate but is held at the bonded surface of the nitrogen impervious coating. The ability of the relatively weak coating to act as a sealant and withstand the ever-increasing nitrogen pressure becomes wholly dependent upon its adhesion to the surface of the stronger substrate.

The maximum pressure tolerated by the coating is measured, first with the coated side up, then with coated side down (or vice versa), this pressure being indicated by a pressure gauge attached to the plenum chamber. From these values the percent adhesion is calculated by the formula Percent adhesion = $\frac{\text{Bursting pressure, coated side up}}{\text{Bursting pressure, coated side down}} \times 100$ For the sake of precision, the average of 5 tests for each value is generally taken for use in calculation.

Various factors such as the cooling rate of the web, the web thickness, the temperature of the paper, the substrate, the time interval lapsing after the application of the polymer to the substrate, etc., affect the adhesion.

The blend of this invention and the method of preparing said blend are best illustrated by the following examples. The extruder used in the following examples was a 2½" Egan extruder of 20–1 L/D. The screw was a nylon type screw having a 4 to 1 compression ratio. The coating die was a 30-inch standard "V-face" (90° included angle). The coating train consisted of a standard Egan laboratory paper coater. The coater was equipped with two preheat rolls allowing the paper to be preheated and dried by making an "S" wrap around these rolls. The preheat rolls were heated by 150 p.s.i.g. steam.

EXAMPLE I

Polyethylene having a density of 0.960 gm./cc. and a melt of 5.0 was visbroken to a melt index of 19.1 by heating at about 700° F. for about 5 minutes. Ninety weight parts of this visbroken product was blended with 10 weight parts of Petrothene 207 polyethylene having a density of 0.924 gm./cc. and a melt index of 8.0. The blend was reextruded to pelletize and the pellets had a melt index of 17.4, a density of 0.958 gm./cc., a CIL flow of 2.65 gms./min. and a slope of the CIL curve of 1.89. The resin was applied to 28 lb. per ream bleached kraft paper (ice cream wrap) by use of a 2½" Egan extrusion paper coating machine as hereinbefore described at 415 ft./min. to provide a minimum coating of 4.1 lbs. per ream. Other coatings were applied at 7.5 lbs. per ream (0.5 mil), 11.25 lb. per ream (0.75 mil), and 15 lb. per ream (1.0 mil) for testing. The results of these runs are shown in the following tabulation.

Table I

TESTS ON PAPER COATINGS

| Coating (mil) | Coating lb./ream | MVT [1] gm./100 in.²/24 hr. |
|---|---|---|
| 0.5 | 7.5 | 1.5 |
| 0.75 | 11.25 | 0.9 |
| 1.00 | 15.00 | 0.6 |

[1] ASTM E96–53T.

These runs indicate that coatings as low as 7.5 lbs. per ream give excellent moisture vapor transmission resistance.

EXAMPLE II

A series of runs were made to determine the effect of visbreaking of the blend instead of the high density polymer prior to blending as was done in Example I. A blend of 90 parts by weight of high density polyethylene (the same as in Example I) and 10 parts Petrothene 207 (same as Example I) were blended and visbroken to 17.6 melt index by heating at about 700° F. for about 5 minutes. The visbroken blend had a density of 0.957 gm./cc., a CIL flow of 2.75 grams per minute and a slope of the CIL curve of 1.77. Paper (28 lb. per ream bleached kraft) was coated to a minimum coating weight of 6 lbs. per ream at 275 ft./min. Properties of coated papers having the coating applied at 7.5 lb./ream (0.5 mil), etc. are shown in Table II.

*Table II*

TESTS ON COATED PAPERS

| Coating (mil) | Coating lb./ream | MVT gm./100 in.²/24 hr. | Grease Proofness MIL-B-121A |
|---|---|---|---|
| 0.5 | 7.5 | 1.7 | Pass |
| 0.75 | 11.25 | 0.9 | Pass |
| 1.00 | 15.00 | 0.6 | Pass |

Upon comparing this data with Table I, it is seen that it makes no difference whether the high density polyethylene is visbroken prior to blending or subsequent thereto. It is also noted that even the 7.5 lb./ream coating passed the grease proofness test.

EXAMPLE III

A blend was prepared by dry mixing 90 parts of pelleted visbroken high density polyethylene (originally having a density of 0.960 gm./cc. and a melt index of 5.0) having a melt index of 19.5 with 10 parts per weight of pelleted polyethylene prepared in a high pressure process (Alathon-16) having a melt index of 4.0 and a density of 0.923 gm./cc. The mixture was charged to an extruder equipped with a slot die for paper coating as hereinbefore described. The resin was extruded upon kraft paper at a temperature of about 600° F. Strongly adherent coatings of 10 lbs./ream were obtained at a rate of 350 ft./min., the maximum speed of the equipment.

In a parallel run using the above visbroken resin containing no low density polyethylene, the maximum rate that could be realized to provide a satisfactory coating was 200 ft./min. and the minimum coating was 18 lbs./ream.

The above runs indicate conclusively that the blend of this invention permits paper coating to be achieved at a much increased rate of speed compared to the visbroken high density polyethylene and permits the application of fewer lbs. of polymer per ream of paper.

EXAMPLE IV

A series of runs were made to compare the coating characteristics of polymers having different melt indices with a variation in the ratio of low density polyethylene used. The high density polyethylene had a density of 0.960 gm./cc. and a melt index of 1.5 and was visbroken to the designated melt index at a temperature of about 700° F. for about 5 minutes. The data in Table III were obtained by setting a 60 r.p.m. screw speed and determining the maximum speed (thinnest coating) obtainable. The data in Table IV were obtained by setting a paper speed at 370 ft./min. (the maximum speed of the equipment at the time the run was made) and a screw speed of 100 r.p.m. If a good coating was obtained with these conditions, screw speed was decreased until the thinnest coating the resin would allow was obtained. If a good coating was not obtained at 370 ft./min. and 100 r.p.m. screw speed, the paper speed was decreased until a good coating was obtained. All runs were performed with a melt temperature of about 600° F. and with 30 lbs. per ream southern kraft.

*Table III*

| Run No. | Resin [1] | Screw Speed, r.p.m. | Paper Speed, ft./min. | Coating Weight, lbs./ream |
|---|---|---|---|---|
| 1 | Resin A (Melt Index 21.3) | 60 | 180 | 17¾ |
| 2 | 90 pts. Resin A and 10 pts. Resin B | 60 | 340 | 8¼ |
| 3 | 85 pts. Resin A and 15 pts. Resin B | 60 | 370 | 7 |
| 4 | 80 pts. Resin A and 20 pts. Resin B | 60 | 370 | 7½ |
| 5 | Resin A (Melt Index 10.3) | 60 | 150 | 16¾ |
| 6 | 90 pts. Resin A and 10 pts. Resin B | 60 | 250 | 9¼ |
| 7 | 85 pts. Resin A and 15 pts. Resin B | 60 | 370 | 6½ |
| 8 | 80 pts. Resin A and 20 pts. Resin B | 60 | 370 | 6¼ |
| 9 | Resin A (Melt Index 5.3) | 60 | 115 | 25½ |
| 10 | 90 pts. Resin A and 10 pts. Resin B | 60 | 140 | 18¾ |
| 11 | 85 pts. Resin A and 15 pts. Resin B | 60 | 235 | 10½ |
| 12 | 80 pts. Resin A and 20 pts. Resin B | 60 | 275 | 8½ |

See footnote at bottom of table IV.

*Table IV*

| Run No. | Resin [1] | Screw Speed, r.p.m. | Paper Speed, ft./min. | Coating Weight, lbs./ream |
|---|---|---|---|---|
| 13 | Resin A (Melt Index 21.3) | 100 | 270 | 17¼ |
| 14 | 90 pts. Resin A and 10 pts. Resin B | 65 | 370 | 8¼ |
| 15 | 85 pts. Resin A and 15 pts. Resin B | 47 | 370 | 5½ |
| 16 | 80 pts. Resin A and 20 pts. Resin B | 48 | 370 | 5½ |
| 17 | Resin A (Melt Index 10.3) | 100 | 220 | 20½ |
| 18 | 90 pts. Resin A and 10 pts. Resin B | 100 | 370 | 11½ |
| 19 | 85 pts. Resin A and 15 pts. Resin B | 57 | 370 | 5¾ |
| 20 | 80 pts. Resin A and 20 pts. Resin B | 55 | 370 | 6¼ |
| 21 | Resin A (Melt Index 5.3) | 100 | 160 | 28¼ |
| 22 | 90 pts. Resin A and 10 pts. Resin B | 98 | 220 | 20½ |
| 23 | 85 pts. Resin A and 15 pts. Resin B | 95 | 290 | 15 |
| 24 | 80 pts. Resin A and 20 pts. Resin B | 85 | 370 | 8 |

[1] Resin A—High Density Polyethylene, density 0.960 gm./cc. MI of 5.0, prior to visbreaking. Resin B—Alathon 16, Polyethylene, density of 0.923 gm./cc., MI of 4.0.

It will be noted from the above Tables III and IV that the blends of this invention greatly improves the permissible paper coating speed and permits a very significant reduction in the amount of coating applied in lbs./ream of paper. It is to be noted also that the blend of this invention is particularly useful for the high viscosity (low melt index) high density polymer.

EXAMPLE V

The physical properties of a blend of this invention were compared to typical low density and medium density resins.

Table V

|  | A [1] | B [2] | C [3] |
|---|---|---|---|
| Resin Density, g./cc | 0.914 | 0.930 | 0.958 |
| Melt Index, g./10 minutes | 8 | 4 | 12 |
| CIL Flow Index, g./10 minutes (374° F. 1500 p.s.i.) | 19 | 9 | 18 |
| Vicat Softening Temp.,° F.[4] | 190 | 224 | 248 |
| Hardness, Shore D [5] | 44 | 50 | 68 |
| Tensile Strength, 20 in./min., p.s.i.[6] | 1,450 | 2,200 | 3,400 |

[1] Typical Low Density Polyethylene.
[2] Typical Medium Density Polyethylene.
[3] 85 parts visbroken high density polyethylene, density 0.960 gm./cc., melt index 5.0 prior to visbreaking, 15 parts low density polyethylene, density 0.914, melt index 7.8.
[4] ASTM D-1525-57T.
[5] Determined by the method of ASTM-67-58T.
[6] Determined by the method of ASTM-D-638-52T.

EXAMPLE VI

The vapor transmission resistance properties of the blend of this invention were compared to typical low density and medium density polyethylenes on a 40 lb. kraft paper except for the grease proofness test which was run on a special treated ordnance kraft.

Table VI

|  | A [1] | B [2] | C [3] |
|---|---|---|---|
| Resin Density, g./cc | 0.914 | 0.930 | 0.958 |
| Melt Index, g./10 minutes | 8 | 4 | 12 |
| Maximum Coating Speed, ft./min.[4] | 660 | 660 | 630 |
| Minimum Coating Weight, lbs./ream [4] | 4 | 4 | 4.8 |
| MVT, 15 lb. Coating, gm./100 in.²/24 hrs ASTM E-96-53T [6] | 1.10 | 0.80 | 0.65 |
| Coating Weight for Equal Protection at 1.5 MVT | 12 | 8.9 | 6.9 |
| Coating Weight on Treated Ordnance Kraft to Pass Greaseproofness in MIL-B-121, lbs./ream [5] | 24 | 20 | 12 |
| Kinetic Coefficient of friction at 15 lb./ream on 40 lb./ream paper | 0.58 | 0.46 | 0.31 |
| Abrasion Resistance, Tabor mg./10000 cycles on 15 lb./ream coated paper | 12 | 7 | 5.5 |

[1] Typical Low Density Polyethylene.
[2] Typical Medium Density Polyethylene.
[3] 85 parts visbroken high density polyethylene, density 0.960 gm./cc., melt index 5.0 prior to visbreaking, 15 parts low density polyethylene, density 0.914, melt index 7.8.
[4] At maximum output of the 2½" extruder.
[5] Nibrok Kraft 1711 neutral natural, Brown Paper Company.
[6] 100° F. and 90±5% relative humidity.

It is to be noted from the above table that the coating weight for equal protection at 1.5 moisture vapor transmission is approximately one-half of that necessary for equal protection with a typical low density resin. The same is true for the amount needed to pass the grease proofness test. Thus, the inherent protective properties of the high density resins such as abrasion resistance, moisture vapor transmission, and grease proofness are retained while permitting the utilization of a lesser amount of material at coating speeds approximating those obtainable with the low density polymer.

While certain examples, structures, composition and process steps have been described for purposes of illustration, the invention is not limited to these. Variation and modification within the scope of the disclosure and claims can readily be effected by those skilled in the art.

We claim:

1. A coating resin comprising a blend of (A) about 80 to 95 weight parts per 100 parts of the blend of a thermally degraded polymer of ethylene having a density in the range 0.940 to 0.990 gm./cc. and (B) about 5 to 20 weight parts of a polymer of ethylene having a density of less than 0.930 gm./cc., said blend having a density in the range of 0.950 to 0.965 gm./cc., a melt index of 5 to 20 and a CIL flow curve slope of 1.5 to 1.9.

2. The resin of claim 1 wherein (A) is subjected to thermally degrading conditions to narrow the molecular weight distribution prior to blending, said treated polymer having a CIL flow curve slope of at least 5 percent less than the pretreated polymer.

3. The resin of claim 1 wherein said blend is subjected to thermally degrading conditions to narrow the molecular weight distribution, said treated blend having a CIL flow slope of at least 5 percent less than (A).

4. An article of manufacture comprising a substrate and a coating thereon comprising a blend of (A) about 80 to 95 weight parts per 100 parts of the blend of a thermally degraded polymer of ethylene having a density in the range 0.940 to 0.990 gm./cc. and (B) about 5 to 20 weight parts of a polymer of ethylene having a density of less than 0.930, said blend having a density in the range of 0.950 to 0.965 gm./cc., a melt index of 5 to 20 and a CIL flow curve slope of 1.5 to 1.9.

5. The article of claim 4 wherein said substrate comprises paper.

6. The article of claim 4 wherein (A) is subjected to thermally degrading conditions to narrow the molecular weight distribution prior to blending, said treated polymer having a CIL flow curve slope of at least 5 percent less than the pretreated polymer.

7. The article of claim 4 wherein said blend is subjected to thermally degrading conditions to narrow the molecular weight distribution, said treated blend having a CIL flow slope of at least 5 percent less than (A).

8. A method of coating a substrate comprising forming a blend by intimately admixing (A) about 80 to 95 weight parts per 100 total parts of a polymer of ethylene having a density of 0.940 to 0.990 gm./cc. and a melt index of less than 8.0 and (B) about 5 to 20 weight parts of a polymer of ethylene having a density of less than 0.930 gm./cc. and a melt index of 5 to 20, subjecting the blend to thermally degrading conditions to narrow the molecular weight distribution, said treated blend having a CIL flow curve slope at least 5 percent less than (A) and a melt index of 5 to 20, a density of 0.950 to 0.960 gm./cc. and a CIL flow slope of 1.5 to 1.9, extruding a layer of said treated blend onto said substrate and cooling the resulting laminate to below the solidification temperature of the blend of polymers.

9. A method of coating a substrate comprising subjecting a polymer of ethylene having a density in the range of 0.940 to 0.990 gm./cc. and a melt index of less than 8.0 to thermally degrading conditions to produce a polymer having a CIL flow curve slope at least 5 percent less than the pretreated polymer, forming a blend of polymers of ethylene by blending (A) about 80 to 95 weight parts per 100 total parts of a said treated polymer of ethylene and (B) about 5 to 20 weight parts of a polymer of ethylene having a density of less than 0.930 gm./cc. and a melt index of 5 to 20, said blend having a density in the range of 0.950 to 0.960 gm./cc., a melt index of 5 to 20 and a CIL flow slope of 1.5 to 1.9, extruding a layer of said blend onto said substrate and cooling the resulting laminate to below the solidification temperature of the blend of polymers.

(References on following page)

References Cited by the Examiner

UNITED STATES PATENTS

| | | | |
|---|---|---|---|
| 2,868,762 | 1/1959 | Oakes | 260—897 |
| 2,956,035 | 10/1960 | Mock | 260—897 |
| 3,086,958 | 4/1963 | Canterino et al. | 260—897 |

FOREIGN PATENTS 790,115  2/1958  Great Britain.

SAMUEL H. BLECH, *Primary Examiner.*

WILLIAM H. SHORT, LEON J. BERCOVITZ,
*Examiners.*